(12) United States Patent
Aparimit et al.

(10) Patent No.: US 9,818,076 B2
(45) Date of Patent: Nov. 14, 2017

(54) VISUAL RESOURCE ALLOCATION SYSTEM

(71) Applicant: Oracle International Corporation, Redwood Shores, CA (US)

(72) Inventors: Vaibhav Aparimit, Bangalore (IN); Manish Kumar, Bangalore (IN); Raghavan Srinivasan, Bangalore (IN); Niladri De, Hyderabad (IN); Surya Vedula, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 546 days.

(21) Appl. No.: 14/293,373

(22) Filed: Jun. 2, 2014

(65) Prior Publication Data

US 2015/0347944 A1 Dec. 3, 2015

(51) Int. Cl.
*G06Q 10/00* (2012.01)
*G06Q 10/06* (2012.01)

(52) U.S. Cl.
CPC ............... *G06Q 10/06313* (2013.01)

(58) Field of Classification Search
CPC .. G06Q 10/00; G06Q 40/00; G06Q 10/06313; G06F 17/60
USPC ....................................................... 705/7.23
See application file for complete search history.

(56) References Cited

U.S. PATENT DOCUMENTS

| | | | |
|---|---|---|---|
| 5,724,262 A * | 3/1998 | Ghahramani | G06F 11/3419 434/322 |
| 6,023,702 A | 2/2000 | Leisten et al. | |
| 6,678,671 B1 | 1/2004 | Petrovic et al. | |
| 6,691,006 B2 * | 2/2004 | Sinex | G06Q 10/025 244/177 |
| 6,854,088 B2 * | 2/2005 | Massengale | G06F 3/0481 705/7.17 |

(Continued)

FOREIGN PATENT DOCUMENTS

| | | |
|---|---|---|
| EP | 1306786 A3 | 1/2004 |
| WO | 2001029663 A1 | 4/2001 |

(Continued)

OTHER PUBLICATIONS

Absenteeism and Staff Retention, http://www.hrinz.org.nz/Site/Resources/Knowledge_Base/A-H/Absentism.aspx, last downloaded Feb. 12, 2014, p. 1-3.

(Continued)

*Primary Examiner* — Romain Jeanty
(74) *Attorney, Agent, or Firm* — Miles & Stockbridge PC (57) ABSTRACT

A system is provided that visualizes an allocation of resources. The system displays a chart, where the chart includes a list of tasks and a timeline including time units. The system further displays task indicators within the timeline of the chart, where a task indicator includes task indicator segments, and where an area of a task indicator segment is proportional to a work scope of a resource allocated to a corresponding task. The system further receives a user interaction that includes a movement of the task indicator segment from a first task indicator that corresponds to a first task to a second task indicator that corresponds to a second task. The system further allocates the resource from the first task to the second task. The system further modifies the display of at least one task indicator within the timeline of the chart based on the allocation of the resource.

22 Claims, 4 Drawing Sheets

(56) References Cited

U.S. PATENT DOCUMENTS

| | | | |
|---|---|---|---|
| 7,035,809 | B2 | 4/2006 | Miller et al. |
| 7,184,962 | B2 | 2/2007 | Kalnas et al. |
| 7,505,998 | B2 | 3/2009 | Barrett |
| 7,976,311 | B2 | 7/2011 | Bantz et al. |
| 8,306,841 | B2 | 11/2012 | Clarke |
| 8,311,865 | B2 | 11/2012 | Vogel et al. |
| 8,386,286 | B2 | 2/2013 | Srinivas et al. |
| 8,484,060 | B2 | 7/2013 | D' Andrea et al. |
| 8,510,230 | B2 | 8/2013 | John et al. |
| 8,517,742 | B1 | 8/2013 | Johnson et al. |
| 8,543,438 | B1 | 9/2013 | Fleiss |
| 8,560,364 | B2 | 10/2013 | Vogel et al. |
| 8,560,365 | B2 | 10/2013 | Friedlander et al. |
| 8,583,465 | B1 | 11/2013 | Isamat et al. |
| 8,595,044 | B2 | 11/2013 | Bernardini et al. |
| 2003/0126141 | A1 | 7/2003 | Hassman et al. |
| 2004/0002887 | A1 | 1/2004 | Fliess et al. |
| 2004/0017400 | A1 | 1/2004 | Ly et al. |
| 2006/0004618 | A1 | 1/2006 | Brixius |
| 2007/0150327 | A1 | 6/2007 | Dromgold |
| 2008/0172625 | A1 | 7/2008 | Montgomery |
| 2009/0076878 | A1 | 3/2009 | Woerner et al. |
| 2009/0199113 | A1 | 8/2009 | McWhinnie et al. |
| 2009/0234699 | A1* | 9/2009 | Steinglass ........ G06Q 10/06313 705/7.23 |
| 2010/0305994 | A1 | 12/2010 | Gaskell |
| 2011/0208557 | A1 | 8/2011 | Gonzalez Diaz et al. |
| 2012/0116835 | A1 | 5/2012 | Pope et al. |
| 2012/0130907 | A1 | 5/2012 | Thompson et al. |
| 2012/0215578 | A1 | 8/2012 | Swierz, III et al. |
| 2012/0306887 | A1 | 12/2012 | Mohammad et al. |
| 2013/0159197 | A1 | 6/2013 | Singh et al. |
| 2013/0246110 | A1 | 9/2013 | Nakhayi Ashtiani et al. |

FOREIGN PATENT DOCUMENTS

| | | |
|---|---|---|
| WO | 2002082335 A2 | 10/2002 |
| WO | 2008105772 A1 | 9/2008 |

OTHER PUBLICATIONS

Activ Absence Control, http://assets-production.govstore.service.gov.uk/Gii%20Attachments/06b%20Cats%20-%20uploaded/G2.176%20-%20METHODS%20CONSULTING%20LTD/Archive1/B2%20Activ%20Absence%20Control%20Brochure%201210.pdf, last downloaded Jun. 2, 2014, p. 1-8.

Dr. Ahmed Sameh et al., "SE 503 Advanced Project Management", http://www.google.co.in/url?sa=t&rct=j&q=&esrc=s&source=web&cd=16&ved=0CEwQFjAFOAo&url=http%3A%2F%2Finfo.psu.edu.sa%2Fpsu%2Fcis%2Fasameh%2FSE503%2FC-Chain3.PPT&ei=1rcFU5v9AcfprQfBnoHYDw&usg=AFQjCNH2FF1dCMrnt2Q6wWFcsf42NATIkA&bvm=bv.61725948,d.bmk&cad=rja, last downloaded Jun. 2, 2014, p. 1-22.

Assigning Resources to Taslks, http://publub.boulder.ibm.com/infocenter/ratportm/v7r1m1/index.jsp?topic=/com.ibm.help.doc/assigning_resources.html, last downloaded Jun. 2, 2014, p. 1-5.

CA Clarity PPM, Functional Overview of the CA Clarity Project and Portfolio Management System, http://www.ca-clarity.com/cms/upload/EN/pdf/CA_Clarity_Functional_Overview.pdf, last downloaded Jun. 2, 2014, 40 pages.

Calculating Absenteeism, Retention & Turnover, https://www.gnb.ca/0012/Womens-Isuues/wg-es/tools/pdf/hr_calc-e.pdf, last downloaded Jun. 2, 2014, p. 1-3.

Controlling the Uncontrollable—How Return-to-Work Programs Reduce Costs and Boost Productivity, http://research.prudential.com/documents/rp/127974_RTW_WP_r2.pdf, last downloaded Jun. 2, 2014, 11 pages.

Eric Uyttewall, "Dynamic Scheduling with Microsoft Project 2002", J. Ross Pub; 1 edition (Apr. 2003), p. 435.

Employee Scheduling & Human Resource Planning, http://www.mjc2.com/employee-scheduling-software.htm, last downloaded Jun. 2, 2014, p. 1-3.

ERP Software 360, "Assembling the Right Project Team", http://www.erpsoftware360.com/project-team.htm, last downloaded Jun. 2, 2014, p. 1-4.

Gantt Project, http://sourceforge.net/p/ganttproject/feature-requests/383/, last downloaded Jun. 2, 2014, p. 1-2.

GanttPV, http://www.pureviolet.net/ganttpv/, last downloaded Jun. 2, 2014, p. 1-3.

Software Selection Whitepapers, "Software Selection Getting Started Project Teams", http://www.software4distributors.com/media/whitepapers/BSWC_Software_Selection_Project_Teams.pdf, last downloaded Jun. 2, 2014, p. 1-13.

Bevan et al., "How Employers Manage Absence", Institute for Employment Studies—IES, Mar. 2004, http://www.employment-studies.co.uk/pubs/summary.php?id=err25, last downloaded Jun. 2, 2014, p. 1-6.

Harvey Levine, "How to Allocate Resources and Build Optimal Teams", http://www.attask.com/wp-content/uploads/2011/07/ART-How-to-Allocate-Resources-and-Build-Optimal-Teams.pdf, last downloaded Jun. 2, 2014, p. 1-5.

IBM Rational Portfolio Manager, "Project Staffing", http://publib.boulder.ibm.com/infocenter/ratportm/v7r1m1/index.jsp?topic=/com.ibm.help.doc/project_staffing.html, last downloaded Jun. 2, 2014, p. 1-3.

NetSuite Open Air, "Resource Management", http://www.openair.com/Resource-Management, last downloaded Jun. 2, 2014, p. 1.

Planning planet, "Network Diagram/Logic Diagram Cluttered and Unreadable," http://www.planningplanet.com/forums/planning-scheduling-programming-discussion/535990/network-diagram-logic-diagram-cluttered-and, last downloaded Jun. 2, 2014, p. 1-8.

The Omni Group, "OmniPlan Manual", Version 1.0, (2000-2009), p. 1-84.

Oracle Common Application Calendar User Guide, "Oracle Assignment Manager", Release 12.1, Part No. E13407-04, http://docs.oracle.com/cd/E18727_01/doc.121/e13407/T87077T87097.htm, last downloaded Jun. 2, 2014, p. 1-16.

Oracle Data Sheet, "Oracle's Primavera P6 Enterprise Project Portfolio Management", (2013) p. 1-4.

Oracle Projects Fundamentals, "Project Team Definition", Release 12.1, Part No. E13581-04, http://docs.oracle.com/cd/E18727_01/doc.121/e13581/T181945T284438.htm, last downloaded Jun. 2, 2014, p. 1-17.

Kronos, White Paper, "Out Sick: How to Minimize the Impact of Unplanned Absences in the Energy Industry", Reduce Costs and Increase Productivity with an Automated Absence Management Solution, http://www.kronos.com/ads/field/49/Kronos_field_ad.pdf, last downloaded Jun. 2, 2014, p. 1-8.

Assessments.biz, "Profiles Team Analysis Corporate Team Building Tools", http://assessments.biz/corporate-team-building.asp, last downloaded Jun. 2, 2014, p. 1-2.

Project insight, "Resource Allocation in Project Management Software", http://www.projectinsight.net/project-management-software/features/resource-allocation-in-project-management-software.aspx, last downloaded Jun. 2, 2014, p. 1.

Daptiv, "Project Management Office (PMO) Software", http://www.daptiv.com/solutions/daptiv-for-the-pmo.htm, last downloaded Jun. 2, 2014, p. 1-4.

Anonymous as per GECCO double blind submission rules, "Search-based techniques for optimizing software project resource allocation", http://www0.cs.ucl.ac.uk/staff/m.harman/icsm05b.pdf, Jan. 19, 2004, p. 1-11.

TeamSeer, "Smart absence and holiday management software that really saves you time", http://media.teamseer.com/downloads/TeamSeer_brochure.1.pdf, last downloaded Jun. 2, 2014, p. 1-9.

TeamGantt, "View Resource Availability Inside your Gantt Charts!", http://teamgantt.com/blog/2012/10/16/view-resource-availability-inside-your-gantt-charts/, last downloaded Jun. 2, 2014, p. 1-3.

(56) References Cited

OTHER PUBLICATIONS

Microsoft Office Team Planner, "View your team's work with Team Planner", http://office.microsoft.com/en-in/project-help/view-your-team-s-work-with-team-planner-HA010373239.aspx, last downloaded Jun. 2, 2014, p. 1-3.

Tenrox by upland, Project Workforce Management Software—PWM Software, "Resource Management Module", Manage Resources and Schedules across the Entire Organization—and Beyond, http://www.tenrox.com/en/solutions/project-worforce-management-resource-management-module.htm, last downloaded Jun. 2, 2014, p. 1-7.

Wang, et al., "Three-dimensional gantt chart based resource—constrained multiple projects scheduling and critical chain identification", 2011 IEEE 18th International Conference on Industrial Engineering and Engineering Management (IE&EM) vol. Part 3, No., pp. 1597,1601, Sep. 3-5, 2011.

Wikipedia, "Gantt chart", http://en.wikipedia.org/wiki/Gantt_chart, last visited May 1, 2014, p. 1-3.

Available views, http://office.microsoft.com/en-us/project-help/available-views-HP010210179.aspx, last downloaded Nov. 18, 2014, p. 1.

Niladri De et al., U.S. Appl. No. 13/776,747, filed Feb. 26, 2013.

\* cited by examiner

VISUAL RESOURCE ALLOCATION SYSTEM

FIELD

One embodiment is directed to a computer system, and more particularly, to a computer system that displays data.

BACKGROUND

A project can include many tasks, where a task generally refers to an activity to be performed. There are often situations when organizations are required to perform multiple related tasks, for example, as part of a project. The tasks may be related based on an overall objective, and may be required to be performed in sequence, in parallel, etc., for meeting the overall objective.

Resources are often used (or consumed) in the performance of the tasks. Resources generally refer to any people, goods, places, etc., required for the performance of tasks. The more resources assigned to a task, the smaller the duration of the task will likely be due to the increased resources. Further, a critical path is a path that includes a set of tasks connected by interdependencies, where the path spans across a timeline of a project. An example of an interdependency is a "finish-to-start" interdependency, which indicates that a successor task can only start if a predecessor task finishes. Thus, a delay of a task within the critical path will typically delay the overall project. Typically, a project manager is directly responsible for ensuring that a project meets a planned deadline. In a complex project involving many tasks, it is generally critical for a project manager to identify any critical paths contained within a project, and, if possible, eliminate them.

SUMMARY

One embodiment is a system that visualizes an allocation of resources. The system displays a chart within a user interface, where the chart includes a list of tasks and a timeline including time units. The system further displays task indicators that correspond to the tasks within the timeline of the chart, where a task indicator includes task indicator segments, and where an area of a task indicator segment is proportional to a work scope of a resource allocated to a corresponding task. The system further receives a user interaction that includes a drag of the task indicator segment from a first task indicator that corresponds to a first task to a second task indicator that corresponds to a second task. The system further allocates the resource from the first task to the second task. The system further modifies the display of at least one task indicator within the timeline of the chart based on the allocation of the resource from the first task to the second task.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, a visual resource allocation system is provided that visually displays a project that includes one or more tasks and one or more resources, and that facilitates resource allocation among tasks of the project. The visual resource allocation system can display a Gantt chart within a user interface, where the Gantt chart includes the tasks of the project. Further, the visual resource allocation system can extend the functionality of, and the visual information contained within, the Gantt chart by: (1) defining an area of an indicator to be proportional to a work scope embodied in a task, where the indicator is displayed within the Gantt chart, and where the indicator represents the task; and (2) facilitating the movement of an indicator segment across tasks, where an indicator can be segmented into indicator segments, and where each indicator segment represents a resource allocated to the task. By defining an area of an indicator to be proportional to a work scope embodied in a task, the visual resource allocation system can allow a project manager to visually identify tasks that have a larger work scope directly from the displayed Gantt chart without requiring the project manager to navigate to a separate view, such as a task detail view, and wade through information about the tasks, such as planned/estimated effort. Further, by facilitating the movement of an indicator segment across tasks, the visual resource allocation system can allow a project manager to eliminate incidences of a critical path in a project by reallocating resources among tasks, and can achieve frictionless resource allocation directly from the displayed Gantt chart. Further, the visual resource allocation system can display the aforementioned visual information within a single user interface.

Figure 1:
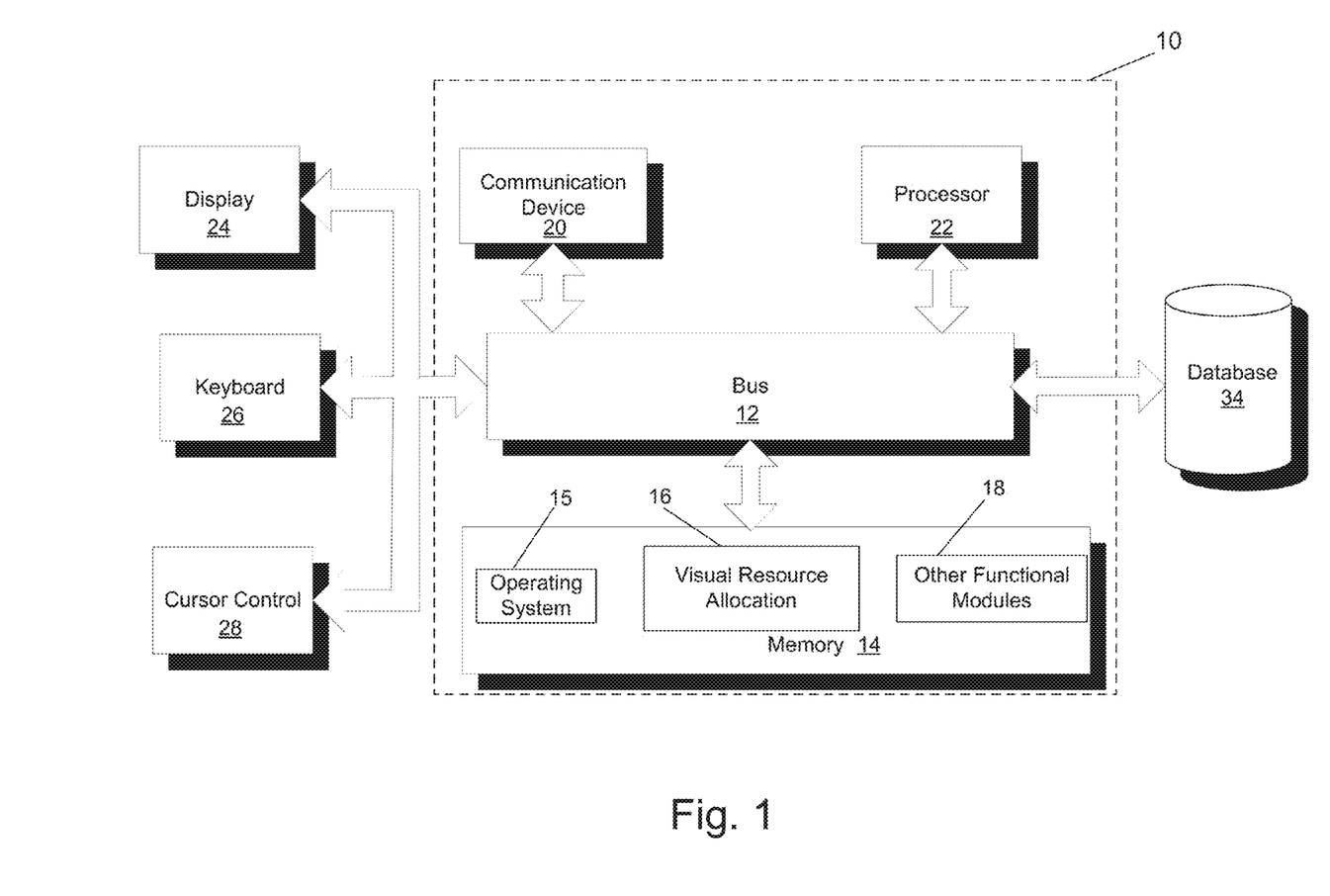
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a visual resource allocation module 16, as well as other functional modules 18. Operating system 15 can provide an operating system functionality for system 10. Visual resource allocation module 16 can provide functionality for visualizing an allocation of resources among tasks, as further disclosed below. In certain embodiments, visual resource allocation module 16 can comprise a plurality of modules, where each module provides specific individual functionality for visualizing an allocation of resources among tasks. System 10 can also be part of a larger system. Thus, system 10 can include one or more additional functional modules 18 to include the additional functionality. For example, functional modules 18 may include modules that provide additional functionality, such as functionality of a "Primavera Enterprise Project Portfolio Management" by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, a project can include many tasks, where a task generally refers to an activity to be performed. A Gantt chart is a useful way of showing tasks, activities, or events displayed against time, and a Gantt chart is commonly used in project management. Within a left portion of a typical Gantt chart is a list of tasks, and along a top portion is a suitable time scale that is based on a suitable time unit (such as a day, a month, a year, etc.). Each task is represented by a bar, or some other type of indicator, within a right portion of the Gantt chart. A position and width of the bar collectively indicate a start date-time (i.e., date and/or time) of the task, a duration of the task, and an end date-time of the task. This can allow a user of the Gantt chart to identify: (1) what the various tasks are; (2) when each task begins and ends; (3) how long each task is scheduled to last; (4) where tasks overlap with other tasks, and by how much; and (5) the start date-time and end date-time of the overall project. The bars in a Gantt chart typically illustrate the start date-times and finish date-times of respective tasks against a time scale, where the width of the bar is typically proportional to the duration of the task, and the height of the bar is typically constant for all tasks. For a complex project, a Gantt chart can include many bars, and can be very complicated.

Gantt charts are typically used by project managers for task planning purposes. Gantt charts can assist in easily generating a visualization of critical paths in a project. If a project manager identifies a critical path, a project manager will typically reallocate resources from tasks that are not within the critical path to tasks that are within the critical path, in an attempt to remove the critical path from the project by reducing the duration of the tasks within the critical path. Although the duration of non-critical tasks will increase in response to the re-allocation, the duration of critical tasks will decrease, which can result in the critical path being eliminated. However, in order to execute re-allocation of resources across tasks, either for the purpose of eliminating a critical path or for some other purpose, project managers typically have to shift, toggle, or otherwise navigate to another view. The constant shifting between views can disrupt a viewer's experience. In other words, an existing Gantt chart design paradigm typically does not present a unified view of task duration and resource allocation in the same view.

In project management, a project manager typically has the following tools available to perform task planning resource allocation among tasks: (1) a Gantt chart; and (2) one or more resource allocation charts. A Gantt chart, as previously described, typically represents a task as a horizontal bar, or some other type of indicator, on a time scale, where a width of the horizontal bar represents a duration of the task. A Gantt chart also typically visually indicates one or more critical paths in a project by highlighting the critical tasks in red. However, a Gantt chart typically does not visually indicate any information about whether a resource is assigned to a task or not. Further, a Gantt chart typically does not provide a way for a user to reallocate resources among tasks. Thus, to get a more complete understanding of the project, a project manager typically has to consult one or more resource allocation charts. A resource allocation chart typically displays an allocation of a resource over a time scale, such as a day. However, a resource allocation chart typically does not display any of the task information which is typically displayed in a Gantt chart, such as interdependencies between the tasks. Thus, there is no easy way of allocating tasks to (or de-allocating tasks from) a resource using a resource allocation chart. Also, a resource allocation chart typically does not allow managing of other attributes of a task, such as a start date-time, a finish date-time, an allocation, etc. Thus, a project manager typically has to frequently switch between a Gantt chart and a resource allocation chart to effectively plan tasks and allocate resources.

Thus, according to an embodiment, a visual resource allocation system can solve the aforementioned problem by extending the functionality of a Gantt chart to present a unified view of task duration and resource allocation in a single view. The functionality of the visual resource allocation system is further described below in greater detail.

In accordance with an embodiment, a scope of work (or "work scope") of a resource allocated to a task is defined based on a percentage resource utilization of the resource, a throughput of the resource (also identified as productivity of the resource, or units per time ("UPT") of the resource), and a duration of the task. More specifically, a work scope of a resource can be defined using the following formula: work scope of resource=(percentage resource utilization of resource)*(throughput of resource)*(duration of task).

In order to eliminate a critical path, a duration of tasks within the critical path generally needs to be reduced. As indicated in the aforementioned equation, a duration of a task is a function of: (1) a work scope of a resource allocated to the task; (2) a percentage resource utilization of the resource allocated to the task; and (3) a throughput of the resource allocated to the task. A work scope of a resource allocated to a task defines a scope or amount of work performed by the resource for the task. The work scope is directly proportional to the duration of the task, all other factors remaining constant. In order to eliminate a critical path, the work scope of a task can be reduced. However, reducing a work scope of a task is one of the least common approaches employed to eliminate a critical path.

A percentage resource utilization of a resource allocated to a task is a measure of a percentage of a time unit the resource spends performing work on the task. For example, a hydraulic engineer can be equally allocated to two tasks. In this example, the percentage resource utilization of the engineer per task is be 50%. The percentage resource utilization is inversely proportional to the duration of the task, all other factors remaining constant. Thus, increasing the percentage resource utilization of the resource allocated to the task decreases the duration of the task. Project managers often increase the percentage resource utilization of resources allocated to critical tasks to ensure timely completion of the overall project.

A throughput of a resource allocated to a task is a measure of the productivity of the resource, and, more specifically, is a measure of an amount of work performed by the resource over a time unit. The productivity is inversely proportional to the duration of the task, all other factors remaining constant. Thus, a more productive resource can complete a task faster, thereby reducing incidences of a critical path within a project.

According to an embodiment, the visual resource allocation system can display an enhanced Gantt chart within a user interface. The enhanced Gantt chart can include a list of tasks and a timeline including time units, such as days, months, or years. The enhanced Gantt chart can further include task indicators (such as bars) that are displayed within the timeline, and that represent the tasks. The task indicators can be segmented across a height dimension, creating one or more task indicator segments. The task indicator segments correspond to resource allocated to a corresponding task represented by the task indicator. Each task indicator segment can include the following information: (1) a name of a resource; (2) a background fill color that represents a role of the resource; (3) a throughput of the resource; and (4) a percentage resource utilization of the resource for the corresponding task.

For example, four resources (i.e., two tractors and two farmers), can be allocated to a task. The visual resource allocation system can display a Gantt chart within a user interface that includes a task indicator that represents the task. In this example, the task indicator can be segmented into four task indicator segments that represent the four resources, where the four task indicator segments are cut across a height dimension. Two task indicator segments that represent the two tractors can have an orange fill color, and the other two task indicator segments that represent the two farmers can have a green fill color. In addition, each task indicator segment can include a name of a corresponding resource, a throughput of the resource, and a resource percentage utilization of the resource for the task.

According to the embodiment, a height of a task indicator segment is directly proportional to a throughput of a corresponding resource and a percentage resource utilization of the resource. In a general scenario, a task of a Gantt chart has N number of resources allocated to the task, where the N resources belong to the same role type (i.e., resources $R_1, R_2, \ldots, R_N$). Each of the N resources have throughputs of $UPT_1, UPT_2, \ldots, UPT_N$, respectively. Further, each of the N resources have percentage resource utilizations of $U_1, U_2, \ldots, U_N$, for the task. A task indicator of the Gantt chart that represents the task is segmented into N task indicator segments, where the respective heights of the N segments are $h_1, h_2, \ldots, h_N$. Because a height of a task indicator segment is directly proportional to a throughput of a corresponding resource and a percentage resource utilization of the resource, the visual resource allocation system displays the N task indicator segments according to the following relation: $h_1: h_2: \ldots : h_N = UPT_1*U_1: UPT_2*U_2: \ldots : UPT_N*U_N$.

As a direct consequence of displaying a task indicator segment with a height that is proportional to a throughput of a corresponding resource and a percentage resource utilization of the resource, a user of a visual resource allocation system can compare multiple task indicators within a Gantt chart and identify which tasks have more resources allocated from the Gantt chart view, without navigating to a separate view. Further, the user can identify which resource is (or which resources are) allocated to each task by viewing the corresponding task indicator within the Gantt chart. In a scenario where tasks have resource allocation of the same type of roles, the user of the visual resource allocation system can also compare work scopes of the tasks by viewing areas of the task indicators that correspond to the tasks. This is a directly corollary of the aforementioned equation: work scope of resource=(percentage resource utilization of resource)*(throughput of resource)*(duration of task). A duration of a task is directly proportional to a length of the task indicator, and a product of a throughput of a resource and a percentage resource allocation of the resource is directly proportional to a height of the task indicator. Thus, a scope of work for a task is directly proportional to an area of the task indicator. Thus, by identifying task indicators with large areas (in particular, task indicators with large widths), the user can identify that the corresponding tasks have large work scopes, and can potentially reallocate more resources for the identified tasks.

According to an embodiment, the visual resource allocation system can also allow a user to allocate a resource from a first task to a second task by "clicking" on a task indicator segment of a first task indicator that corresponds to the first task and moving (e.g., "dragging") the task indicator segment to a second task indicator that corresponds to the second task within the Gantt chart that is displayed within the user interface. Further, in response to the re-allocation of the resource from the first task to the second task, the visual resource allocation system can modify a display of the first task indicator and the second task indicator. This is because, in response to the re-allocation of the resource from the first task to the second task, a duration of the first task can increase, and a duration of the second task can decrease. Thus, in response to the re-allocation of the resource from the first task to the second task, the visual resource allocation system can increase a width of the first task indicator and can decrease a width of the second task indicator. In an alternate embodiment, the user can "click" on the first task indicator and move (e.g., "drag") the first task indicator to the second task indicator, and can effectively allocate the resource(s) from the first task to the second task. What this effectively means is that the user can allocate a resource across multiple tasks by changing the percentage resource utilization of the resource.

Figure 2:
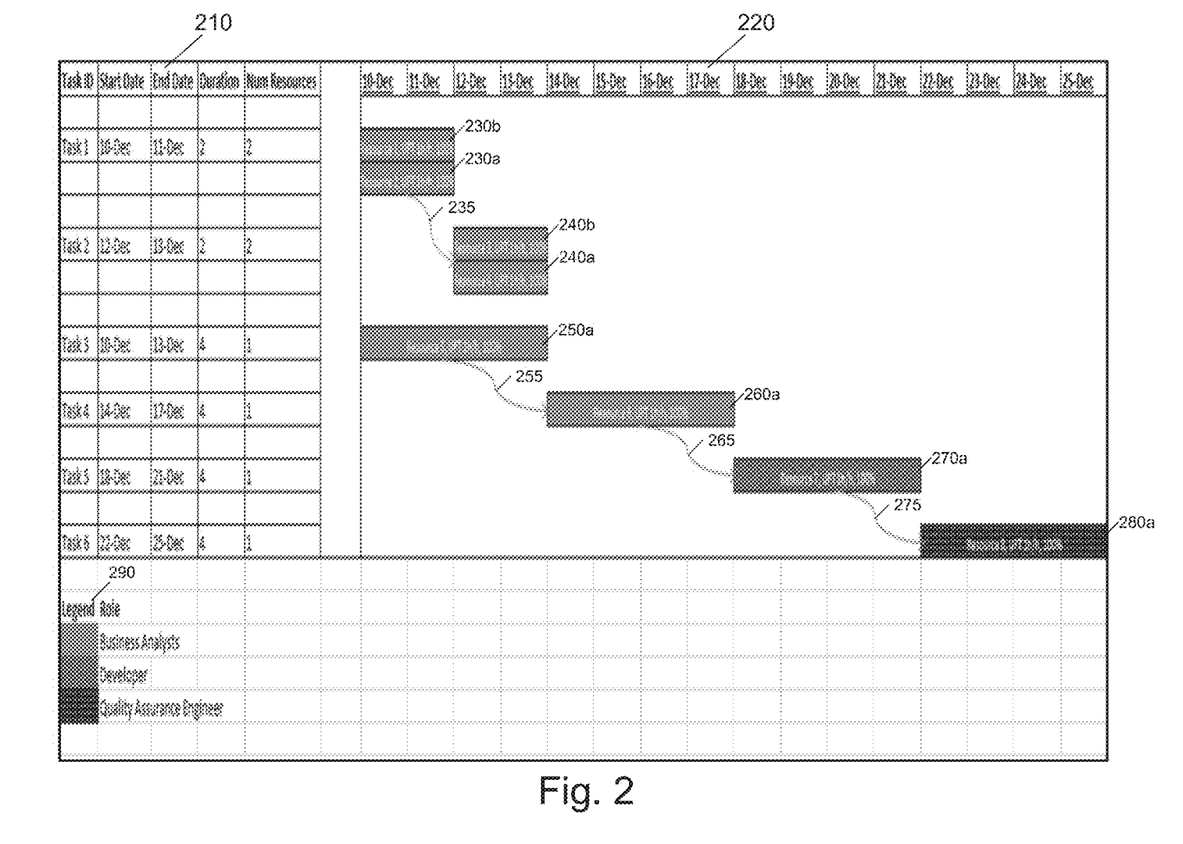
FIG. 2 illustrates a visual display of a Gantt chart within a user interface of a visual resource allocation system before a resource allocation, according to an embodiment of the invention.

FIG. 2 illustrates a visual display of a Gantt chart within a user interface of a visual resource allocation system before a resource allocation, according to an embodiment of the invention. The Gantt chart provides a view of a project. The project has a scheduled start date of December 10, and a scheduled end date of December 25. The visual resource allocation system displays task list 210 within the Gantt chart. Task list 210 is a list of six tasks: task 1; task 2; task 3; task 4; task 5; and task 6. The visual resource allocation system further displays timeline 220 within the Gantt chart. Timeline 220 includes 16 time units: time units December 10-December 25.

In accordance with the embodiment, the visual resource allocation system further displays task indicators 230, 240, 250, 260, 270, and 280 within the Gantt chart. Task indicator 230 corresponds to task 1, task indicator 240 corresponds to task 2, task indicator 250 corresponds to task 3, task indicator 260 corresponds to task 4, task indicator 270 corresponds to task 5, and task indicator 280 corresponds to task 6. Further, task indicator 230 includes task indicator segments 230a and 230b, task indicator 240 include task indicator segments 240a and 240b, task indicator 250 includes task indicator segment 250a, task indicator 260 includes task indicator segment 260a, and task indicator 270 includes task indicator segment 270a.

The visual resource allocation system further displays a resource name, throughput, and percentage resource utilization within each task indicator segment of the Gantt chart. More specifically, the visual resource allocation system displays: "Resource 2," "UPT 1 h/h" and "100%" within task indicator segment 230a; "Resource 1," "UPT 1h/h" and "100%" within task indicator segment 230b; "Resource 4," "UPT 1h/h" and "100%" within task indicator segment 240b; "Resource 3," "UPT 1 h/h" and "100%" within task indicator segment 240a; "Resource 5," "UPT 1 h/h" and "100%" within task indicator segment 250a; "Resource 6," "UPT 1 h/h" and "100%" within task indicator segment 260a; "Resource 7," "UPT 1 h/h" and "100%" within task indicator segment 270a; and "Resource 8," "UPT 1 h/h" and "100%" within task indicator segment 280a. The visual resource allocation system further displays a fill color for each task indicator segment of the Gantt chart based on a role type of each task indicator segment. Legend 290 indicates a mapping of fill color to role. Thus, the Gantt chart indicates that two resources (i.e., two business analysts) are allocated to tasks 1 and 2, one resource (i.e., a business analyst) is allocated to task 3, one resource (i.e., a business analyst) is allocated to task 4, one resource (i.e., a developer) is allocated to task 5, and one resource (i.e., a quality assurance engineer) is allocated to task 6.

The visual resource allocation system further displays interdependency indicators between the task indicators. More specifically, the visual resource allocation system displays interdependency indicators 235, 255, 265, and 275. Interdependency indicator 235 is an interdependency indicator that is displayed between task indicators 230 and 240, and represents an interdependency between task 1 and task 2. Interdependency indicator 255 is an interdependency indicator that is displayed between task indicators 250 and 260, and represents an interdependency between task 3 and task 4. Interdependency indicator 265 is an interdependency indicator that is displayed between task indicators 260 and 270, and represents an interdependency between task 4 and task 5. Interdependency indicator 275 is an interdependency indicator that is displayed between task indicators 270 and 280, and represents an interdependency between task 5 and task 6.

According to the embodiment, task indicators 250, 260, 270, and 280, as well as interdependency indicators 255, 265, and 275, are part of a first path. The first path starts on December 11 and ends on December 25. Thus, the first path spans across timeline 220. Because the first path spans across timeline 220, the first path is a critical path. Because the first path is a critical path, a delay in any of the tasks that corresponds to task indicators 250, 260, 270, and 280 (i.e., tasks 3, 4, 5, and 6) can delay the overall project. Thus, in certain embodiments, the visual resource allocation system highlights task indicators 250, 260, 270, and 280, and interdependency indicators 255, 265, and 275, as being part of the critical path. This can be done by displaying task indicators 250, 260, 270, and 280, and interdependency indicators 255, 265, and 275 with a color that is distinct from a color of the other task indicators and interdependency indicators, such as red. Further, task indicators 230 and 240, as well as interdependency indicator 235, are part of a second path. The second path starts on December 11 and ends on December 13. Thus, the second path only spans across a portion of timeline 220, rather than the entirety of timeline 220. Because the second path only spans across a portion of timeline 220, the second path is not a critical path. Thus, in certain embodiments, the visual resource allocation system displays task indicators 230 and 240, and interdependency indicator 235, without any highlighting. Thus, task indicators 230 and 240, and interdependency indicator 235 can be displayed using an identical color that is used to display other task indicators and interdependency indicators.

Figure 3:
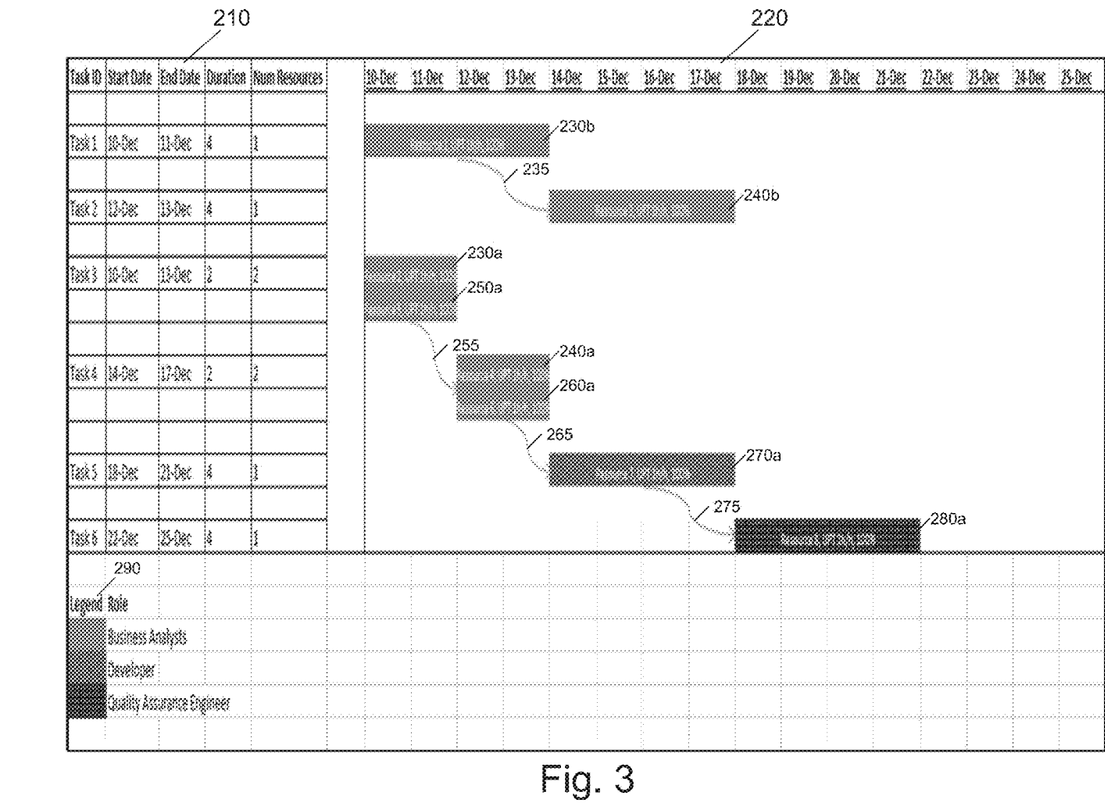
FIG. 3 illustrates a visual display of a Gantt chart within a user interface of a visual resource allocation system after a resource allocation, according to an embodiment of the invention.

FIG. 3 illustrates a visual display of a Gantt chart within a user interface of a visual resource allocation system after a resource allocation, according to an embodiment of the invention. Except as described below, the Gantt chart illustrated in FIG. 3 is identical to the Gantt chart illustrated in FIG. 2. According to the embodiment, a user "clicks" on task indicator segment 230a and moves (e.g., "drags") task indicator segment 230a from task indicator 230 to task indicator 250. In response to this user interaction, the visual resource allocation system de-allocates a resource that corresponds to task indicator segment 230a (i.e., the business analyst named "Resource 2") from a task that corresponds to task indicator 230 (i.e., task 1). The visual resource allocation system further re-allocates the resource to a task that corresponds to task indicator 250 (i.e., task 3). The de-allocation of the resource from task 1 results in a duration of task 1 increasing in size by a factor of two (i.e., from two days to four days), because only one resource (i.e., the business analyst named "Resource 1") is now allocated to task 1. Thus, the visual resource allocation system modifies a display of task indicator 230, where task indicator 230 only includes task indicator segment 230b, where a height of task indicator 230 is decreased by a factor of two, and where a width of task indicator 230 is increased by a factor of two. Further, the re-allocation of the resource to task 3 results in a duration of task 3 decreasing in size by a factor of two (i.e., from four days to two days), because two resources (i.e., the business analyst named "Resource 2" and the business analyst named "Resource 5") are now allocated to task 3. Thus, the visual resource allocation system modifies a display of task indicator 250, where task indicator 250 includes task indicator segments 230a and 250a, where a height of task indicator 250 is increased by a factor of two, and where a width of task indicator 250 is decreased by a factor of two.

Also in accordance with the embodiment, the user "clicks" on task indicator segment 240a and moves (e.g., "drags") task indicator segment 240a from task indicator 240 to task indicator 260. In response to this user interaction, the visual resource allocation system de-allocates a resource that corresponds to task indicator segment 240a (i.e., the business analyst named "Resource 4") from a task that corresponds to task indicator 240 (i.e., task 2). The visual resource allocation system further re-allocates the resource to a task that corresponds to task indicator 260 (i.e., task 4). The de-allocation of the resource from task 2 results in a duration of task 2 increasing in size by a factor of two (i.e., from two days to four days), because only one resource (i.e., the business analyst named "Resource 3") is now allocated to task 2. Thus, the visual resource allocation system modifies a display of task indicator 240, where task indicator 240 only includes task indicator segment 240b, where a height of task indicator 240 is decreased by a factor of two, and where a width of task indicator 240 is increased by a factor of two. Further, the re-allocation of the resource to task 4 results in a duration of task 4 decreasing in size by a factor of two (i.e., from four days to two days), because two resources (i.e., the business analyst named "Resource 4" and the business analyst named "Resource 6") are now allocated to task 4. Thus, the visual resource allocation system modifies a display of task indicator 260, where task indicator 260 includes task indicator segments 240a and 260a, where a height of task indicator 260 is increased by a factor of two, and where a width of task indicator 260 is decreased by a factor of two.

As illustrated in FIG. 3, the first path that includes task indicators 250, 260, 270, and 280, as well as interdependency indicators 255, 265, and 275, starts on December 11, but now ends on December 21, rather than December 25. This is because the position of task indicators 260, 270, and 280 are modified based on the decrease in width of task indicator 250, and because the positions of task indicators 270 and 280 are also modified based on the decrease in width of task indicator 260. Because the first path now spans a portion of timeline 220, rather than the entirety of timeline 220, the first path is no longer a critical path. Further, as also illustrated in FIG. 3, the second path that includes task indicators 230 and 240, as well as interdependency indicator 235, starts on December 11, but now ends on December 17, rather than December 13. This is because the position of task indicator 240 is modified based on the increase in width of task indicator 230. However, the second path still spans a portion of timeline 220, rather than the entirety of timeline 220. Thus, the second path is still not a critical path. Therefore, the re-allocation of resources effectively eliminates the critical path from the project displayed within the Gantt chart. As also illustrated in FIG. 3, while the visual resource allocation system modifies the height and width dimensions of task indicators 230, 240, 250, and 260, the visual resource allocation system keeps the area of task indicators 230, 240, 250, and 260 constant.

Figure 4:
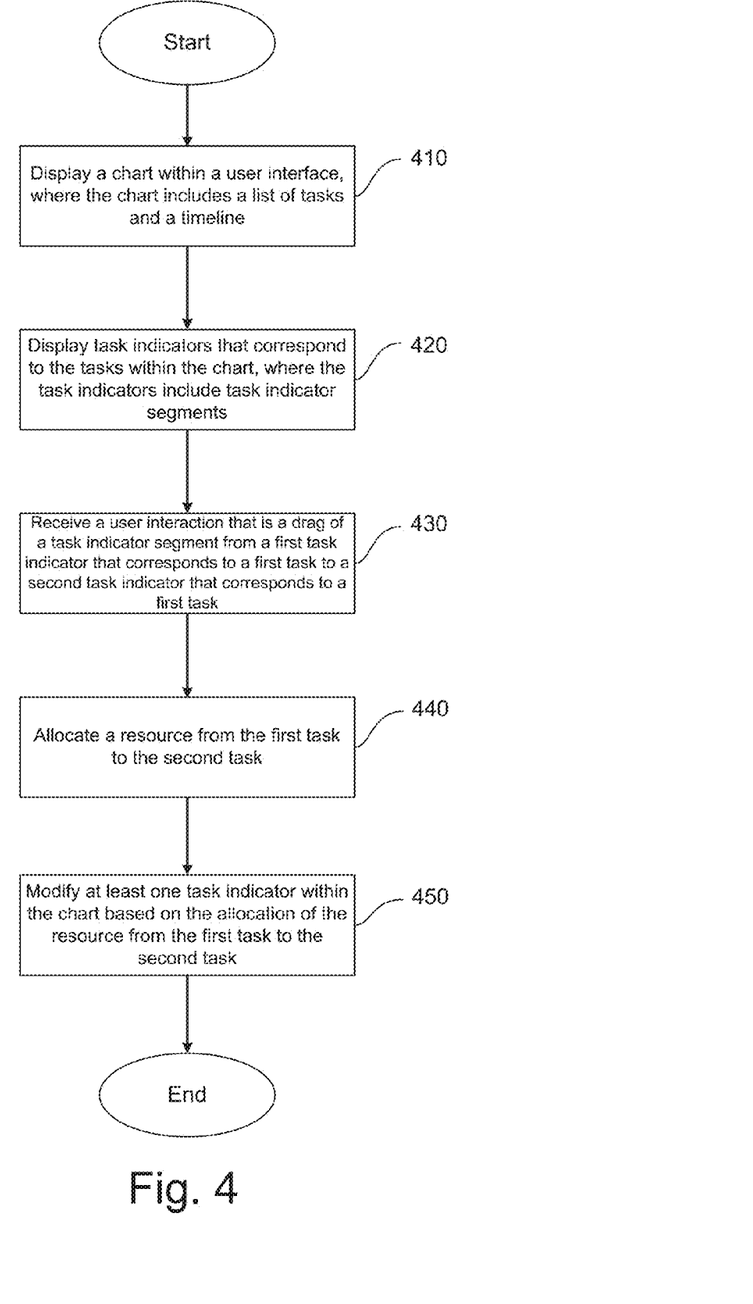
FIG. 4 illustrates a flow diagram of the functionality of a visual resource allocation module, according to an embodiment of the invention.

FIG. 4 illustrates a flow diagram of the functionality of a visual resource allocation module (such as visual resource allocation module 16 of FIG. 1), according to an embodiment of the invention. In one embodiment, the functionality of the flow diagram of FIG. 4 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 410. At 410, a chart is displayed within a user interface. The chart includes a list of one or more tasks, and a timeline including one or more time units. In certain embodiments, a time unit can be one of: a day, a week, a month, or a year. Further, in some embodiments, the list of one or more tasks can be displayed within a left portion of the chart, and the timeline can be displayed with a top portion of the chart. In some of the embodiments, the chart is a Gantt chart. The flow then proceeds to 420.

At 420, one or more task indicators are displayed within the timeline of the chart. The one or more task indicators correspond to one or more tasks. The one or more tasks can be tasks of a project. In certain embodiments, a task indicator can be a bar. Further, a task indicator includes one or more task indicator segments. An area of a task indicator segment is proportional to a work scope of a resource allocated to a corresponding task. In some embodiments, a height of the task indicator segment can be proportional to a throughput of the resource and a percentage resource utilization of the resource, and a width of the task indicator segment can be proportional to a duration of the corresponding task. In certain embodiments, the task indicator segment can further include a name of the resource, a throughput of the resource, and a percentage resource utilization of the resource. In some of these embodiments, the task indicator segment further can further include a fill color that represents a role of the resource. Further, in some embodiments, one or more interdependency indicators that correspond to one or more interdependencies among the one or more tasks can also be displayed within the timeline of the chart. In these embodiments, an interdependency indicator connects one task indicator with another task indicator. Further, in some of these embodiments, a set of task indicators and interdependency indicators that represent a critical path can be highlighted within the chart. In certain embodiments, the set of task indicators and interdependency indicators that represent a critical path can be displayed using a color that is distinct from a color used to display other task indicators and interdependency indicators. The flow then proceeds to 430.

At 430, a user interaction is received. In certain embodiments, the user interaction can be a movement (such as a drag) of a task indicator segment from a first task indicator that corresponds to a first task to a second task indicator that corresponds to a second task. The flow then proceeds to 440.

At 440, a resource that is currently allocated to the first task is allocated from the first task to the second task. The allocation of the resource from the first task to the second task can be in response to the user interaction that is received. The flow then proceeds to 450.

At 450, the display of at least one task indicator within the timeline of the chart is modified based on the allocation of the resource from the first task to the second task. In certain embodiments, a width of the first task indicator can be increased, and a width of the second task indicator can be decreased. Further, in some of these embodiments, a position of one or more successor task indicators of the first task indicator can be modified based on the increase of the width of the first task indicator. Even further, in some of these embodiments, a position of one or more successor task indicators of the second task indicator can be modified based on the decrease of the width of the first task indicator. The flow then ends.

Thus, a visual resource allocation system is provided that can extend the functionality and visual information contained in a Gantt chart. The visual resource allocation system can set an area of an individual task indicator to be proportional to a scope of work embodied in a corresponding task.

This can assist a project manager to visually identify "bigger" tasks directly from a view of the Gantt chart without requiring the project manager to navigate to a separate view, such as a task detail view, and locate a planned/estimated effort value for the task. Thus, the Gantt chart view can make it easy to visually identify resource-heavy tasks and distinguish such tasks from long-duration tasks that may require more resources or more utilization of current resources. The Gantt chart view can also clearly identify the productivity of the resources allocated to the tasks, and can assist in decisions made to assign specific resources to specific tasks. The visual resource allocation system can further allow a user to easily move a segment of a task indicator from a first task to a second task. This can achieve efficient resource allocation directly from a view of the Gantt chart within a single user interface. Thus, the visual resource allocation system can provide an intuitive display of resource allocation for tasks, which clearly show how a change in resource allocation impacts a critical path of a project. This can allow a project manager to perform resource allocation from a view of a Gantt chart with an aim of eliminating a critical path from a project. Allowing a project manager to more easily eliminate critical paths from projects can result in significant improvements over current resource allocation processes.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A computer-readable medium having instructions stored thereon that, when executed by a processor, cause the processor to visualize an allocation of resources among tasks, the visualizing comprising:
generating, for displaying, a chart within a single user interface, the chart including a list of tasks and a timeline comprising one or more time units;
generating, for displaying, task indicators that correspond to the tasks within the timeline of the chart, each task indicator including one or more task indicator segments, an area of a task indicator segment being proportional to a work scope of a resource allocated to a corresponding task, a first dimension of a task indicator segment being proportional to a throughput of the resource and a percentage resource utilization of the resource, and a second dimension of a task indicator segment being proportional to a duration of the corresponding task;
receiving a user interaction that comprises a movement of the task indicator segment from a first task indicator that corresponds to a first task to a second task indicator that corresponds to a second task;
allocating the resource from the first task to the second task; and
modifying the display of at least one task indicator within the timeline of the chart based on the allocation of the resource from the first task to the second task.

2. The computer-readable medium of claim 1, wherein the modifying the display of at least one task indicator further comprises increasing a width of the first task indicator and decreasing a width of the second task indicator.

3. The computer-readable medium of claim 2, wherein the modifying the display of the at least one task indicator further comprises modifying a position of one or more successor task indicators of the first task indicator based on the increase of the width of the first task indicator.

4. The computer-readable medium of claim 3, wherein the modifying the display of the at least one task indicator further comprises modifying a position of one or more successor task indicators of the second task indicator based on the decrease of the width of the second task indicator.

5. The computer-readable medium of claim 1, wherein the task indicator segment further comprises a name of the resource, a throughput of the resource, and a percentage resource utilization of the resource.

6. The computer-readable medium of claim 5, wherein the task indicator segment further comprises a fill color that represents a role of the resource.

7. The computer-readable medium of claim 1, wherein the each task indicator comprises a bar.

8. The computer-readable medium of claim 1, the visualizing further comprising displaying one or more interdependency indicators that correspond to one or more interdependencies among the one or more tasks within the timeline of the chart, wherein an interdependency indicator connects one task indicator with another task indicator.

9. The computer-readable medium of claim 1, the visualizing further comprising highlighting a set of task indicators and interdependency indicators that represent a critical path.

10. The computer-readable medium of claim 1, wherein the movement of the task indicator segment from the first task indicator to the second task indicator comprises a drag of the task indicator segment from the first task indicator to the second task indicator.

11. A computer-implemented method for visualizing an allocation of resources among tasks, the computer-implemented method comprising:
generating, for displaying, a chart within a single user interface, the chart including a list of tasks and a timeline comprising one or more time units;
generating, for displaying, task indicators that correspond to the tasks within the timeline of the chart, each task indicator including one or more task indicator segments, an area of a task indicator segment being proportional to a work scope of a resource allocated to a corresponding task, a first dimension of a task indicator segment being proportional to a throughput of the resource and a percentage resource utilization of the resource, and a second dimension of a task indicator segment being proportional to a duration of the corresponding task;

receiving a user interaction that comprises a movement of the task indicator segment from a first task indicator that corresponds to a first task to a second task indicator that corresponds to a second task;

allocating the resource from the first task to the second task; and modifying the display of at least one task indicator within the timeline of the chart based on the allocation of the resource from the first task to the second task.

12. The computer-implemented method of claim 11, wherein the modifying the display of at least one task indicator further comprises increasing a width of the first task indicator and decreasing a width of the second task indicator.

13. The computer-implemented method of claim 12, wherein the modifying the display of the at least one task indicator further comprises modifying a position of one or more successor task indicators of the first task indicator based on the increase of the width of the first task indicator.

14. The computer-implemented method of claim 13, wherein the modifying the display of the at least one task indicator further comprises modifying a position of one or more successor task indictors of the second task indicator based on the decrease of the width of the second task indicator.

15. The computer-implemented method of claim 11, wherein the task indicator segment further comprises a fill color that represents a role of the resource.

16. The computer-implemented method of claim 11, wherein each task indicator comprises a bar.

17. A system for visualizing an allocation of resources among tasks, the system comprising:

a memory;

a processor coupled to said memory;

a chart display module configured to display a chart within a single user interface, the chart including a list of tasks and a timeline comprising one or more time units;

a task indicator display module configured to display task indicators that correspond to the tasks within the timeline of the chart, each task indicator including one or more task indicator segments, an area of a task indicator segment being proportional to a work scope of a resource allocated to a corresponding task, a first dimension of a task indicator segment being proportional to a throughput of the resource and a percentage resource utilization of the resource, and a second dimension of a task indicator segment being proportional to a duration of the corresponding task;

a user interaction module configured to receive a user interaction that comprises a movement of the task indicator segment from a first task indicator that corresponds to a first task to a second task indicator that corresponds to a second task; and a resource allocation module configured to allocate the resource from the first task to the second task, wherein the task indicator display module is further configured to modify the display of at least one task indicator within the timeline of the chart based on the allocation of the resource from the first task to the second task, and wherein the chart display module, the task indicator display module, the user interaction module and the resource allocation module are executed by said processor.

18. The system of claim 17, wherein the task indicator display module is further configured to increase a width of the first task indicator and decreasing a width of the second task indicator.

19. The system of claim 18, wherein the task indicator display module is further configured to modify a position of one or more successor task indicators of the first task indicator based on the increase of the width of the first task indicator.

20. The system of claim 19, wherein the task indicator display module is further configured to modify a position of one or more successor task indicators of the second task indicator based on the decrease of the width of the second task indicator.

21. The system of claim 17, wherein the task indicator segment further comprises a fill color that represents a role of the resource.

22. The system of claim 17, wherein each task indicator comprises a bar.

* * * * *